July 20, 1948. T. R. SMITH 2,445,410
SHAFT SEALING MEANS
Filed April 27, 1946
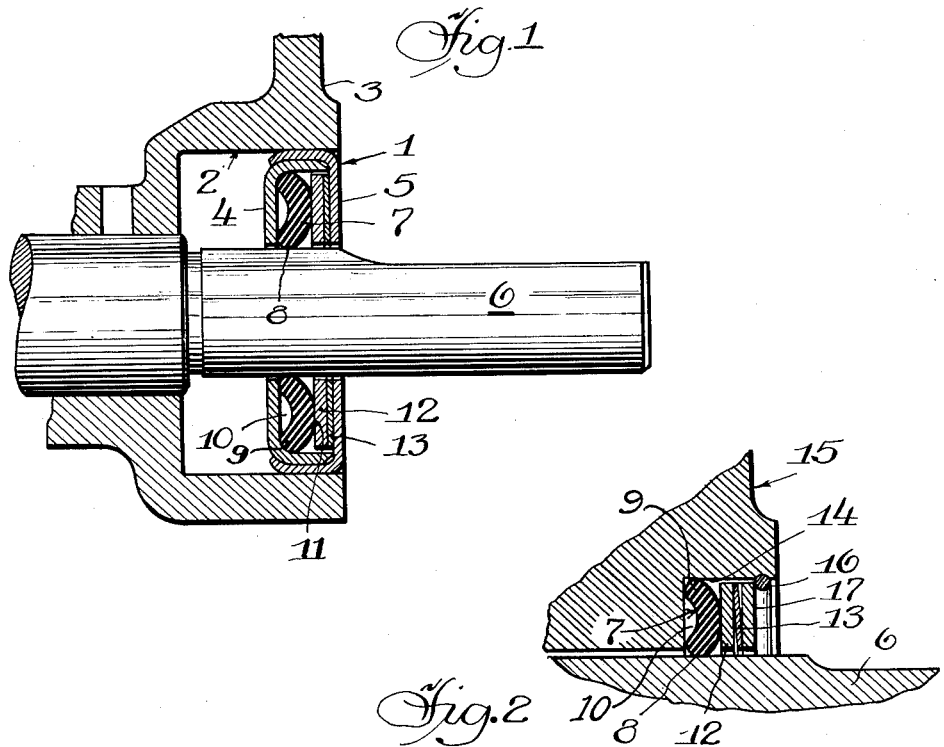
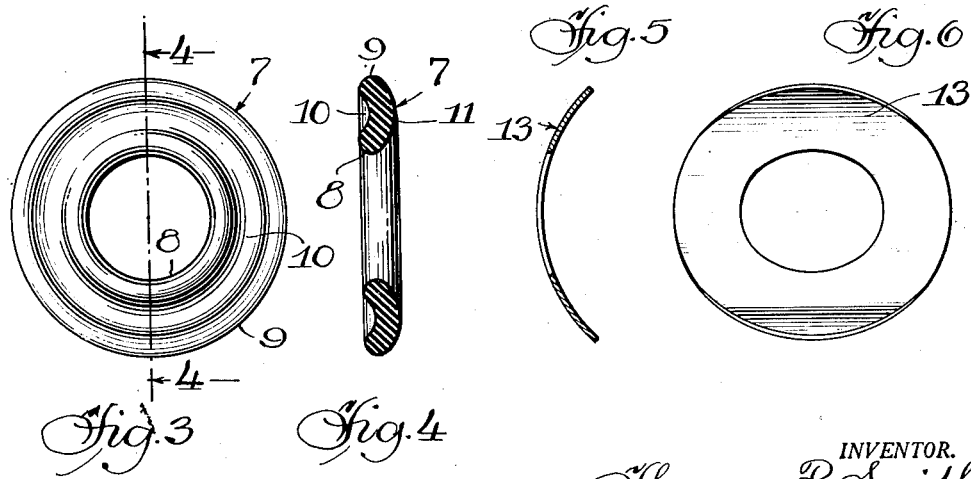
INVENTOR.
Thomas R. Smith
BY
Parkinson & Lane
Attys Patented July 20, 1948

2,445,410

UNITED STATES PATENT OFFICE 2,445,410

SHAFT SEALING MEANS

Thomas R. Smith, Newton, Iowa, assignor to The Maytag Company, Newton, Iowa, a corporation of Delaware Application April 27, 1946, Serial No. 665,495

3 Claims. (Cl. 286—5)

The present invention relates to a fluid seal and especially to a novel sealing means or member for effectively sealing the space or annular opening between a shaft and its surrounding housing.

Among the objects of the present invention is the provision of a novel resilient sealing element so constructed and arranged as to maintain sealing contact with both the shaft and its encompassing housing. This shaft to be sealed may rotate, reciprocate or remain stationary.

The present invention further comprehends a novel arcuate-shaped sealing member formed of a resilient rubber-like material and having rounded contacting edges engaging the shaft and surrounding housing in such manner that such edges maintain effective sealing contact under all operating conditions. By constructing the sealing member of arcuate shape and without bonding or clamping it to the encompassing housing, spring pressure applied to the convex side of the sealing member maintains the contacting rounded edges with the desired sealing pressure.

Another object of the present invention is the provision of a novel seal assembly including a resilient sealing ring of substantially arcuate shape and with the opposite edges rounded and forced into sealing contact with a shaft and encompassing retainer or housing, and a flat washer pressed against the convex side of the sealing ring.

Further objects are to provide a construction of maximum simplicity, efficiency, economy and ease of assembly and operation, and such further objects, advantages and capabilities as will later more fully appear and are inherently possessed thereby.

The invention further resides in the construction, combination and arrangement of parts illustrated in the accompanying drawings, and while there is shown therein a preferred embodiment, it is to be understood that the same is susceptible of modification and change, and comprehends other details, arrangements of parts, features and constructions without departing from the spirit of the invention.

In the drawing:

Figure 1 is a view in vertical cross-section of one embodiment of the novel sealing means in a retaining shell press fitted into an encompassing housing and with the sealing element having sealing contact with a shaft.

Fig. 2 is a fragmentary cross-sectional view similar to Fig. 1 but showing an alternate embodiment with the sealing element mounted in a counterbore in a gear case or other housing and devoid of any retainer or retaining shell.

Fig. 3 is a front view of an arcuate or crescent-shaped sealing element.

Fig. 4 is a view in vertical cross-section of this sealing element taken in a plane represented by the line 4—4 of Fig. 3.

Fig. 5 is a view in vertical cross-section through a spring washer for tensionally mounting the seal and showing its contour prior to assembly.

Fig. 6 is a view in front elevation of the spring washer.

Referring to the illustrative embodiment selected to disclose the novel invention, Fig. 1 shows the novel sealing assembly embodied in a unitary inwardly opening channel-shaped retainer 1 press-fitted into a bore 2 of a surrounding housing or case 3. The retainer comprises an inner channel section or shell 4 and an outer channel section or shell 5 spun over the inner section and both having a centrally disposed opening slightly larger than and to permit a shaft 6 to be inserted and project therethrough.

Disposed within the channel of the retainer is provided a resilient sealing element 7 preferably formed of rubber-like material including natural or compounded synthetic rubber, and molded into the disclosed crescent or arcuate shape and having its opposite ends 8 and 9 rounded to present a rounded or curved sealing edge or lip having adjustable sealing contact with the shaft 6 and interior of the retainer 1. The ends 8 and 9 are preferably rounded with a radius curvature being equal to approximately one-half the thickness of the body portion and this thickness being equal to approximately one-third the radial width of the member between the opposite ends or the inner and outer sealing edges thereof.

The concave surface 10 of the sealing element is disposed toward the radial flange on the section or shell 4 while the rounded or convex surface 11 is engaged by a flat washer 12, and against the latter is mounted tensioning means such as a dished spring washer 13 disposed between it and the inner surface of the radial flange on the outer shell or section 5. The spring washer 13 forces the flat washer 12 against the convex side of the sealing element and thereby applying sufficient spring pressure to force the inside and outside diameter or rounded ends 8 and 9 against the shaft and retainer, respectively. The arching effect of the rounded edges of this arcuate or crescent-shaped resilient sealing element bearing against the retainer and shaft resists the action of the spring washer 13 which is mounted with its normally concaved side against the flat washer 12, and the sealing edges are forced into and maintained in sealing engagement at all times and regardless of whether the shaft is rotating, reciprocating or stationary.

If there is any appreciable fluid pressure to seal, the disclosed assembly is preferably reversed or turned around so that the pressure of the fluid being sealed would assist the sealing action of the spring washer or tensioning means 13 and thereby most effectively cause the rounded ends or sealing edges 8 and 9 to engage and maintain a sealing contact with the shaft and interior of the retainer.

The present construction can be assembled as a complete unit and slipped over the end of a shaft in either direction without danger of damage to the rounded sealing lip or edge. Due to the construction of and the manner of assembling the sealing element and tension means applied thereto, the invention compensates for any wear on the sealing edges. It is further to be understood that although the invention is shown as applied to an internal type of seal in which the retainer is mounted by a press fit in the encompassing housing, it may be employed in an external type of seal in which the retainer is mounted by a press fit on the shaft and the sealing edge or lip has a sealing contact with the housing.

In Fig. 1, the sealing element and spring washer are shown assembled in a retaining shell, whereas Fig. 2 shows their application and assembly without such retainer. In this form of the invention, the sealing element 7, washer 12 and spring washer 13 are disposed directly within a counterbore 14 in a gear case or housing 15. This assembly may be held in position by a snap ring 16 held within a groove in the counterbore and seating either against an auxiliary washer 17 or, by eliminating such auxiliary washer, directly against the spring washer 13. This provides a simple assembly that eliminates the retainer 1 of Fig. 1, as well as any possibility of leakage around the press fit of the retainer in the surrounding housing. Also, it permits easy access to the sealing means for inspection and removal without damage to the retaining means and seal.

When assembled the spring member 13 and the flat washer 12 act in an axial direction and force the rounded ends or edges 8 and 9 of the sealing member 7 against the shaft 6, adjacent radial surface or shoulder and the outside diameter of the recess or counterbore 14. As will be clearly apparent from the drawing, the sealing member 7 is molded of a resilient, impervious material and of arcuate-shaped cross-section through the circumferential axis with the arc so formed being less than 180° whereby a toggle effect is secured and the ends maintained in sealing contact. The sealing member is also of substantial thickness so as to resist collapse under operating conditions, whereby the spring member 13 applies an axial compressive force against the resilient sealing member and maintains it under continuous line contact with the shoulder, outside diameter of the bore and the shaft, simultaneously.

Having thus disclosed my invention, I claim:

1. In a fluid seal for sealing the space between a shaft and an enlarged recess about the shaft with a radially extending surface between the shaft and recess, a seal assembly comprising a preformed anular and resilient seal member composed of impervious material of substantial and uniform thickness and of arcuate-shaped cross-section through the circumferential axis and having a concave and a convex side portion with its inner and outer edge portions uniformly rounded to conform to its thickness, said member being disposed in the recess with its concave side portion adjacent the radially extending surface, a washer disposed adjacent the convex side portion of the seal member, a fixed member, and a spring member disposed between the washer and fixed member to act in an axial direction to force the seal member against the surface, outside diameter of the recess, and shaft so that in operation the distance from the surface to the apex of the concave side of said seal member is substantially less than the radius of the concave side of the arcuate section.

2. A fluid seal for sealing the space between a shaft and an encompassing housing having an opening for receiving the shaft, an enlarged bore adjacent the opening, a shoulder between the bore and opening and a groove provided in the bore adjacent the exterior thereof, comprising a seal assembly including a molded relatively thick, annular and resilient sealing member composed of impervious material and of arcuate-shaped cross-section through the circumferential axis the arc being less than 180°, said member being provided with concave and convex side portions and having its inner and outer edges rounded with a radius equal to approximately one-half the thickness of the member, said rounded edges being adapted to be readily inserted into and removed from the bore and about the shaft without damage to the sealing member, and the thickness of said member being such as to resist collapse thereof under normal operating conditions, loosely mounted flat washers disposed adjacent the convex side portion of said member, an annular spring element disposed between the flat washers, and an expandible ring disposed in the groove to hold the element and washers in position in the bore whereby the spring element applies an axial compressive force on the resilient sealing member to maintain it under continuous line contact with the shoulder, the outside diameter of the bore and the shaft, simultaneously.

3. Shaft sealing means for sealing the space between a shaft and an encompassing member having a bore therein, comprising a channel section rigidly mounted in the bore and providing spaced radially projecting flanges forming an inwardly opening channel therebetween about the shaft, a fluid sealing element disposed in said channel section to contact and seal against one of the flanges and the shaft and consisting of a molded annular and resilient sealing element composed of impervious material of substantial and uniform thickness and of arcuate-shaped cross-section through the circumferential axis and said arcuate section extending an angle of less than 180°, the opposite sides of said sealing element provided with a concave and a convex surface and an inner and an outer sealing edge with the radius of curvature of these edges being equal to approximately one-half the thickness of the sealing element, a flat washer disposed in the channel section adjacent the convex surface of the sealing element, and a spring member disposed between the flat washer and the other flange adapted to react in an axial direction against the convex surface to force the edges of the sealing element against the opposite flange and the shaft and thereby maintain sealing contact.

THOMAS R. SMITH.

REFERENCES CITED

The following references are of record in the file of this patent:

UNITED STATES PATENTS

| Number | Name | Date |
|---|---|---|
| 511,734 | Hofstadt | Dec. 26, 1893 |
| 1,901,606 | Marsh | Mar. 14, 1933 |
| 2,097,606 | Smittle | Nov. 2, 1937 |
| 2,286,472 | Delaval-Crow | June 16, 1942 |
| 2,319,067 | Kosatka | May 11, 1943 |
| 2,417,840 | Rodgers et al. | Mar. 25, 1947 |

FOREIGN PATENTS

| Number | Country | Date |
|---|---|---|
| 183,579 | Germany | 1907 |
| 215,362 | Great Britain | 1909 |